(12) United States Patent
Karte

(10) Patent No.: US 9,212,671 B2
(45) Date of Patent: Dec. 15, 2015

(54) PNEUMATIC ACTUATOR AND METHOD FOR OPERATING THE PNEUMATIC ACTUATOR

(75) Inventor: Thomas Karte, Bruchkoebel (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 840 days.

(21) Appl. No.: 13/166,186

(22) Filed: Jun. 22, 2011

(65) Prior Publication Data

US 2011/0315904 A1 Dec. 29, 2011

(30) Foreign Application Priority Data

Jun. 23, 2010 (DE) .......................... 10 2010 024 723

(51) Int. Cl.
- *F15B 9/09* (2006.01)
- *F16K 31/124* (2006.01)
- *F16K 31/42* (2006.01)
- *F15B 11/024* (2006.01)

(52) U.S. Cl.
CPC ................. *F15B 11/024* (2013.01); *F15B 9/09* (2013.01); *F16K 31/124* (2013.01); *F16K 31/42* (2013.01); *F16K 31/1245* (2013.01); *F16K 31/423* (2013.01)

(58) Field of Classification Search
USPC .............................. 251/30.01, 31, 33, 25, 48
See application file for complete search history.

(56) References Cited

U.S. PATENT DOCUMENTS

| | | | | |
|---|---|---|---|---|
| 1,860,516 A | * | 5/1932 | Thomas et al. | 137/2 |
| 2,021,053 A | * | 11/1935 | Englebright et al. | 251/58 |
| 2,230,914 A | * | 2/1941 | Sherman | 251/61.4 |
| 4,614,148 A | * | 9/1986 | Bates | 91/420 |
| 5,167,256 A | * | 12/1992 | Keeney | 137/871 |
| 5,873,437 A | * | 2/1999 | Danek | 188/282.2 |
| 6,112,866 A | * | 9/2000 | Boichot et al. | 188/299.1 |
| RE37,604 E | * | 3/2002 | Kaufman et al. | 123/90.11 |
| 6,779,496 B2 | * | 8/2004 | Gaessler et al. | 123/90.14 |
| 6,857,618 B2 | * | 2/2005 | Ludwig et al. | 251/30.01 |
| 6,896,236 B2 | * | 5/2005 | Wang et al. | 251/30.01 |
| 8,100,046 B2 | | 1/2012 | Tunkers | |

(Continued)

FOREIGN PATENT DOCUMENTS

| | | |
|---|---|---|
| DE | 1926781 | 11/1970 |
| DE | 3637068 A1 | 12/1987 |

(Continued)

*Primary Examiner* — Craig Schneider
*Assistant Examiner* — Jonathan Waddy
(74) *Attorney, Agent, or Firm* — Schiff Hardin LLP

(57) ABSTRACT

In a pneumatic actuator for setting a control armature, a first working chamber and a second working chamber are pneumatically separated from each other by a moveable dividing wall to which the control armature is coupled in a force-transmitting manner. The dividing wall, in case of a pressure difference between the working chambers, is displaced in a first control direction. A positioner is adapted to output at least one pneumatic control signal to the first working chamber. The first and the second working chambers are pneumatically connected to each other via a pneumatic short-circuit duct with a balancing valve disposed in the short-circuit duct for at least one of closing or opening the short-circuit duct. The balancing valve is driveable by the positioner such that in case of a certain operating condition, the balancing valve pneumatically short-circuits the first and the second working chamber for achieving a pressure balance between the chambers.

18 Claims, 3 Drawing Sheets

(56) References Cited

U.S. PATENT DOCUMENTS

2006/0065867 A1* 3/2006 Vonderwell et al. ........ 251/30.01
2008/0250844 A1* 10/2008 Gartner ........................ 73/11.07
2010/0229975 A1* 9/2010 Sweeney et al. .............. 137/556
2011/0248196 A1* 10/2011 Anderson ................... 251/30.01
2011/0284083 A1* 11/2011 Tondolo et al. .................... 137/1

FOREIGN PATENT DOCUMENTS

| DE | 4339489 A1 * | 8/1994 |
| DE | 20118434 U1 | 5/2002 |
| DE | 10303889 B3 | 4/2004 |
| DE | 102006041707 A1 | 11/2007 |
| DE | 202007017130 U1 * | 4/2008 |

* cited by examiner

PNEUMATIC ACTUATOR AND METHOD FOR OPERATING THE PNEUMATIC ACTUATOR

BACKGROUND

The preferred embodiment relates to a pneumatic actuator for setting a control armature, like a control valve, of a field device of a technical processing installation.

A known pneumatic actuator has a pneumatically impingeable working chamber connected to a pneumatic pressure supply in particular via a positioner with an integrated magnetic valve. In order to displace the control valve, the pneumatic working chamber is impinged by the positioner with a pneumatic positive or negative pressure that displaces a positioning plate into a desired control position, the plate being held at a membrane and having attached to it the control valve in a displacement-force-transmitting manner. Therein the positioner impinges on the pneumatic working chamber with a pneumatic set or control pressure signal adjusted by a control routine. In order to subsequently move the control valve back into the initial position, return forces generated for example in a second working chamber, in particular a return chamber, for example through a mechanical unit like a compression spring or through a reverse pneumatic, may act on the positioning plate.

A defined locking position is to be automatically adopted for example in case of a general operational disturbance of the technical processing installation, in particular in case of a control valve designed as a so-called safety valve. This can be achieved in that a preloaded, helical compression spring inside the return chamber pushes the positioning plate and thus the control valve into the locking or emergency position when the pneumatic working chamber is vented.

When controlling the position of the control valve a positioner computes an electrical position setpoint signal based on an actual position and on control parameters of a control center, the signal being converted by an IP-converter of the positioner into a pneumatic control pressure signal which is then output to the working chamber.

In many areas of application it can occur that a pneumatic actuator remains inactive for a prolonged period of time during which the control valve always remains in the same position, for example in a completely open or a completely closed position, and/or that the valve is subject to a critical state of wear. A positioning movement of the control valve generally occurs then when an increased control pressure is generated within a working chamber. The phenomenon of the control valve initially remaining immobile just at the beginning of the positioning movement and subsequent overshooting of the control valve beyond the desired set position resulting from the initial immobility, may occur, which is known as a stick-slip-effect. In order to overcome the initial static friction that may be particularly high for infrequently operated actuators, a correspondingly high pressure must be generated in the pneumatic working chamber.

In the case of a double action drive a pressure difference between a first and a second working chamber (main working chamber and return chamber) is to be adjusted accordingly to a large value in order to overcome the initial starting friction. As soon as the pneumatic drive displaces the control valve from its rest position, the high pressure difference forces the drive to rapidly break out from its rest position, which is difficult to control in terms of control engineering. Thus, due to the inertia of the pneumatic/mechanic components of the double action control drive, the control valve will overshoot the specified position. In many operating conditions a small change in position is desired which, owing to the stick-slip-effect, can only be achieved from the rest position by means of at least one readjustment resulting in a gradual levelling of the control valve around the specified position. A position sensor may recognize the overshooting and the positioner counteracts the latter by reducing the pressure difference at the positioning plate by reducing the pressure in the working chamber. For a double action actuator the return movement of the control valve can be achieved by subjecting the return chamber to pneumatic pressure. The control speed of the pneumatic reversal in the respective working chambers is limited by the air capacity of the positioner as well as the inertia of the system.

SUMMARY

It is an object to improve the control reactivity of the generic pneumatic actuator, in particular in case of high static and low dynamic friction.

In a pneumatic actuator for setting a control armature, a first working chamber and a second working chamber are pneumatically separated from each other by a moveable dividing wall to which the control armature is coupled in a force-transmitting manner. The dividing wall, in case of a pressure difference between the working chambers, is displaced in a first control direction. A positioner is adapted to output at least one pneumatic control signal to the first working chamber. The first and the second working chambers are pneumatically connected to each other via a pneumatic short-circuit duct with a balancing valve disposed in the short-circuit duct for at least one of closing or opening the short-circuit duct. The balancing valve is driveable by the positioner such that in case of a certain operating condition, the balancing valve pneumatically short-circuits the first and the second working chamber for achieving a pressure balance between the chambers.

Further qualities, advantages and features of the preferred embodiment become apparent by means of the following description of the preferred embodiment in conjunction with the accompanying drawings.

DESCRIPTION OF THE PREFERRED EMBODIMENT

Figure 1:
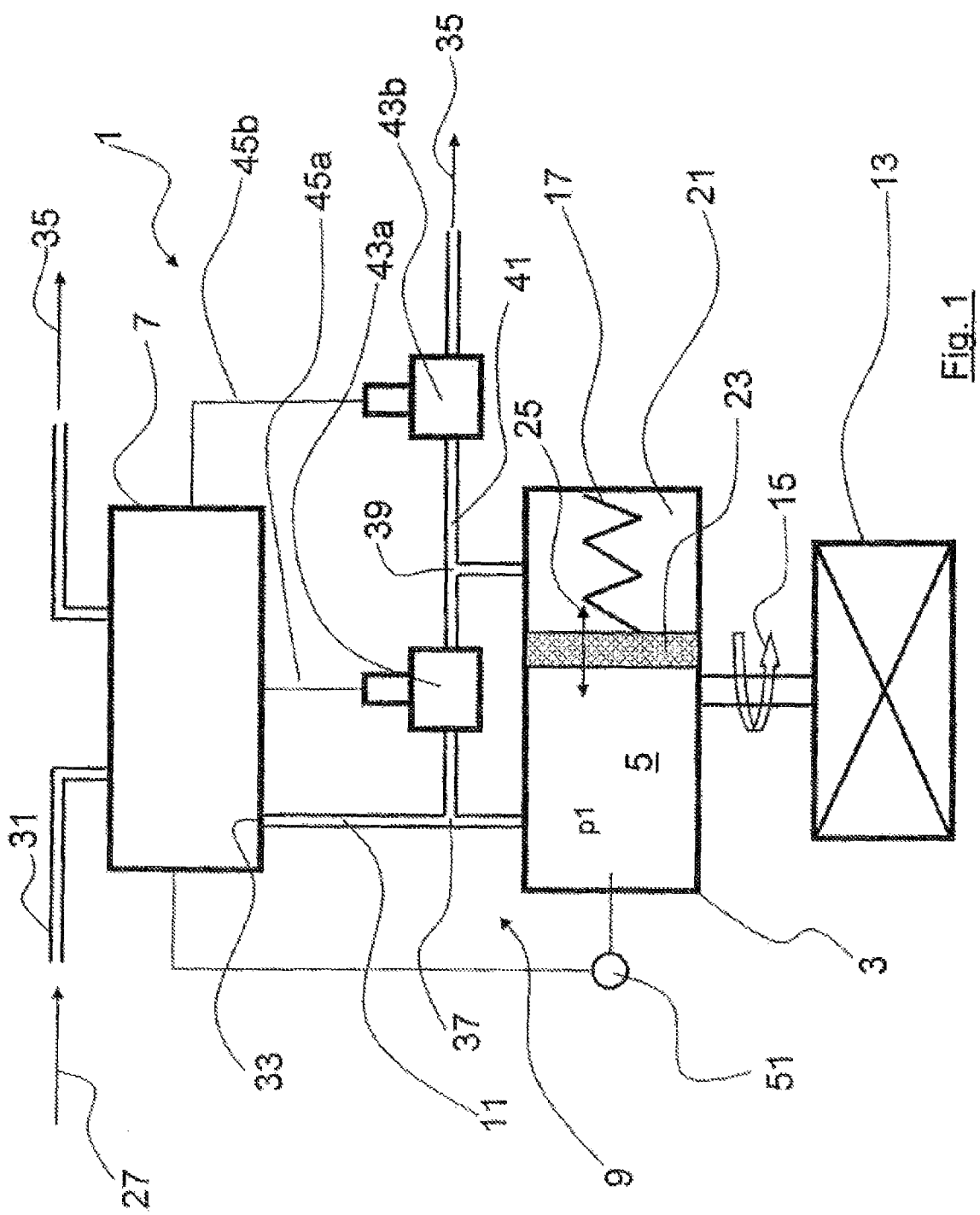
FIG. 1 is a schematic view of a pneumatically acting actuator according to the preferred embodiment.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated embodiment and such further applications of the principles of the invention as illustrated as would normally occur to one skilled in the art to which the invention relates are included.

A pneumatic drive is provided for setting a control armature, in particular a control valve having a first working chamber like a main working chamber and a second working chamber like a return chamber. The pneumatic drive may be a translational actuator or a pivoting actuator. By means of displacing a valve element the pneumatic actuator can (also) partially open or close a valve seat in order to control a technical process fluid stream through the valve seat to conform with the operation of the installation. The first and the second working chamber are pneumatically separated from each other by a movable dividing wall, in particular a membrane wall. The control armature is coupled to the dividing wall in a force transmitting manner so that the displacement of the control armature according to the control action follows the displacement of the dividing wall. In case of a pressure difference in the working chambers the dividing wall is displaced in a control direction towards the chamber with lower pressure, depending on which of the two cam chambers has the higher set pressure. Therein a first control direction may be realized in that a higher control pressure is prevailing in the first working chamber compared to the second working chamber, wherein a displacement in the second control direction occurs than when the set pressure in the second working chamber is higher than in the first working chamber.

Preferably, the control armature and/or the dividing wall are movably mounted in such a way that a displacement is only possible in the first and the opposite second control direction. The pneumatic drive has a positioner adapted to output at least one pneumatic control signal at least to the first working chamber, and if applicable, to a second working chamber in order to built up the pressure difference between the two working chambers. For this purpose, the positioner may feature a magnetic valve that is electrically driven according to the control requirements, wherein the positioner may be connected to a pneumatic pressure source, being in particular a constant supply pressure. In the pneumatic actuator according to the preferred embodiment, the first and the second working chambers are pneumatically connected to each other via a pneumatic short circuit duct. A balancing valve is disposed in the short circuit duct for closing and/or opening the short circuit duct. The balancing valve may be electrically set and is driven by the positioner in such a way that in case of a certain operating condition, in particular one that is captured among others by a position sensor, like a stick-slip-state of the control armature or an exceeding of a predetermined actual pressure difference between the first and the second working chambers, the balancing valve can pneumatically short-circuit the first and the second working chamber for a balance between the working chamber pressures. The measure according to the preferred embodiment of providing a short-circuit duct that directly couples the two working chambers with each other and can be opened and closed by means of a balancing valve, enables to compensate simply and effectively, even to completely avoid an overshooting of a control armature as a consequence of the stick-slip-effect.

Stick-slip can be detected in numerous ways, for example by the position sensor capable of detecting erratic movements of the control armature and/or by means of a pneumatic pressure sensor capable of determining pressure peaks in a working chamber. If such an excess pressure is detected in one of the working chambers it is not reduced merely by venting the working chamber exhibiting excess pressure. Instead, the (second) working chamber of low pressure, designed to generate a movement opposite to the first working chamber, is also subjected to the set pressure, resulting in an immediate pressure difference compensation preventing an overshooting of the pneumatic system.

By means of the adjustable balancing valve in the short-circuit duct, the excessive pressure difference between the working chambers can be reduced by opening the short-circuit duct. The speed as well as the extent of the reduction in pressure difference can be adjusted as desired by setting the balancing valve accordingly. The excess pressure in the main working chamber is directly fed into the return chamber in order to build up an opposing breaking pressure there. In this way, besides a distinctively faster pressure increase and decrease, also a more precise and reactive control behavior of the control system is achieved. Furthermore, an improved energy consumption balance is achieved as in particular less compressed air is emitted unused to the atmosphere.

Furthermore, it is to be noted that preferably after the short circuit duct has been opened by the balancing valve, the latter should be closed again immediately afterwards in order to reinstate the prescribed pressure difference to be set between the working chambers, which is necessary in order to achieve the required position according to the control process. The pressure balancing according to the preferred embodiment by means of opening a short-circuit duct between the working chambers as well as the subsequent pressure difference generation represent a continuous process in which the reinstatement of the specified pressure difference is to be started while the control armature is still moving and thus a renewed immobility of the valve is to be avoided.

In the preferred embodiment of the invention, the balancing valve is realized as a two port/two way valve and/or by at least one magnetic valve. The balancing valve or the magnetic valve is connected to the positioner via an electric line in order to receive electric control signals.

In the preferred embodiment of the invention, the second working chamber can also be impinged by a pneumatic positioning signal of the positioner. Thereby, a so-called double action actuator is realized. The balancing valve is disposed in a duct section that pneumatically connects to each other two pneumatic coupling lines that couple the positioner to the respective working chamber for transmission of the respective pneumatic positioning signal.

In a further development of the preferred embodiment of the invention, a pneumatic venting duct is provided between the second working chamber, like the return chamber, and an atmospheric venting sink. In the exhaust air duct an additional switchable valve may be disposed in order to subject the second working chamber to atmospheric pressure i.e. to vent it in the open state of the switchable valve. In this state, building up of a pressure difference between the working chambers can be achieved through the balancing valve between the first and the second working chambers remaining closed. For pressure balancing in the case of occurrence of a stick-slip between the working chambers, the switchable valve can be operated by the positioner in such a way that the venting connection between the second working chamber and the venting sink is closed. Following pressure balancing between the working chambers, the switchable valve can be opened again, wherein the balancing valve is closed in order to pneumatically separate the working chambers and to produce the specified pressure difference between the working chambers necessary for bringing the control armature into the desired specified position according to the control procedure.

In a further development of the preferred embodiment of the invention, the balancing valve constitutes of two solenoid valves. The pair of solenoid valves is arranged in series behind each other in a venting duct. For venting both working chambers, both solenoid valves must be opened. For venting only one working chamber, like the return chamber, only the solenoid valve is to be opened that is disposed closer to the venting sink. The venting duct connects a pneumatic venting sink, commonly at atmospheric pressure, with a pneumatic coupling duct that pneumatically connects the positioner with the first working chamber, in particular the main working chamber. A branch duct extends away from the venting duct and leads into the second working chamber. The branch of the venting duct is disposed between the two solenoid valves. It is possible to switch in a simple manner between normal operation in which short-circuit pressure balancing between the working chambers is prevented and a special operation in which according to the pressure reduction in the first working chamber a pressure increase in the second working chamber is occurring, owing to the pneumatic short circuit.

If, for example, the positioner is controlled such that the solenoid valve close to the venting sink is closed and, in particular at the same time, the solenoid valve close to the coupling duct is being opened, then a pressure balance is realized via the short circuit duct between the working chambers. For a normal operation of the actuator (without pressure balancing) the positioner is controlled such that the solenoid valve adjacent to the venting sink is opened by the positioner and the solenoid valve adjacent to the coupling duct is closed by the positioner.

In the preferred embodiment of the invention the first and the second working chamber are delimited by a cylindrical outer housing, wherein, in particular, the wall dividing the two working chambers is formed by a piston-like slide mounted fluid-tightly and movably back and forth at an inside of the housing, in particular by a membrane-plate-structure.

In the preferred embodiment of the invention, at least one return spring, preferably several return springs, are disposed in the return chamber exposable in particular to atmospheric pressure by means of, for example, a solenoid valve. The return spring causes a displacement of the dividing wall in a return direction opposite to a positioning direction in which the dividing wall is displaced upon exposure of the first working chamber to an overpressure.

In the preferred embodiment of the invention, a pressure sensor is positioned in at least one of the working chambers, preferably in the first working chamber. The pressure sensor can be connected to the positioner in a signal transmitting manner in order to provide sufficient information to the positioner with respect to an excess pressure in one of the working chambers.

In the preferred embodiment of the invention the first and the second working chamber of the pneumatic actuator are short-circuited only for a short time. This is necessary in particular in the case that while equal pressure prevails in the working chambers displacement of the dividing wall between the working chambers of the pneumatic actuator and thus displacement of the control armature can nonetheless occur because for example a return spring constantly provides bias for the adoption of a safety position or because process stream forces act on the control armature. After a short term activation of the short-circuit mechanism it is deactivated again in order to establish the necessary specified pressure difference in the working chambers so that the desired specified position can be adopted according to the control process. The duration of the pneumatic short-circuit can be adjusted to smaller than 1.0 seconds, 0.5 seconds, 0.2 or 0.1 seconds. In particular, care is to be taken that the duration of the short-circuit mechanism is limited such that, for example following the detection of stick-slip, the pressure difference within the working chamber is built up in time before the control armature, having been put into motion, stops moving. In this respect, for the activation and the deactivation of the short-circuit mechanism, a dynamic behavior of the control armature is to be assured.

In the further, the preferred embodiment of the invention relates to a method for operating a pneumatic actuator, formed in particular according to the preferred embodiment, for setting a control armature, in particular a control valve. According to the method, the working chambers are pneumatically impinged in order to build up a specified pressure difference between both working chambers. In order to build up this pressure difference a corresponding pneumatic control signal is fed to the working chamber and, if applicable, to the second working chamber in particular by a positioner, wherein the pneumatic control signal in the first working chamber is higher than the one in the second working chamber in order to displace the control armature into a first direction. According to the preferred embodiment of the invention, the first and the second working chambers are pneumatically connected, in particular, via a duct system. In this way, in case of a certain operational situation such as a state of stick-slip of the control armature and/or the exceeding of a predetermined pneumatic auxiliary pressure difference between the first and the second working chamber, the first and the second working chambers are pneumatically short-circuited in order to approximate the pressures in the working chambers to each other.

It shall be understood that the method according to the preferred embodiment of the invention may proceed according to the functionality of the actuator.

The preferred embodiment of the invention also relates to a method for operating a pneumatic actuator.

Figure 2:
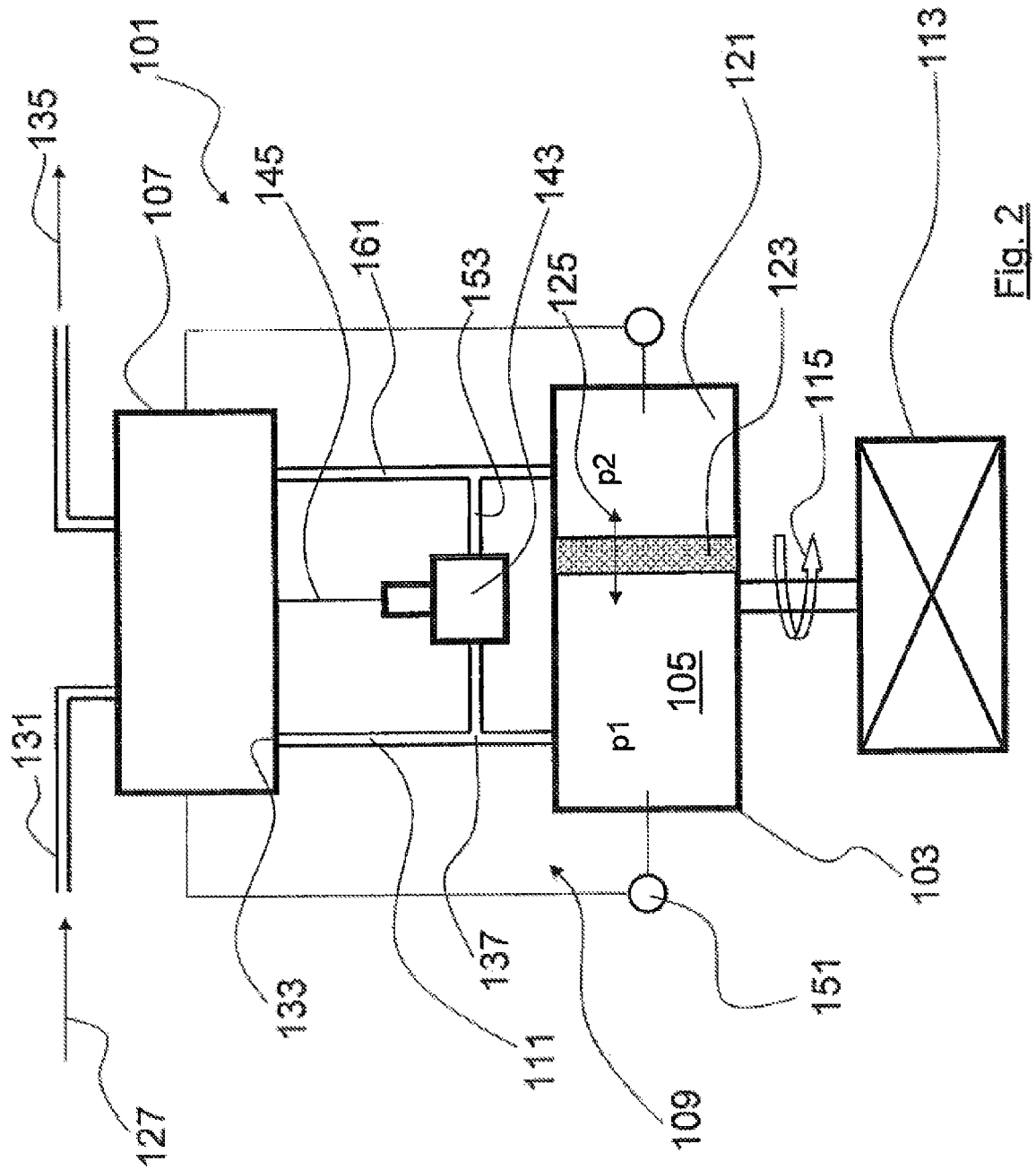
FIG. 2 is a schematic view of a double acting pneumatic actuator according to the preferred embodiment.

In FIG. 1 in general a single action pneumatic actuator is given the reference numeral 1. The pneumatic actuator 1 essentially is composed of three main components, that is a drive housing 3 with a pneumatic working chamber 5 and a return chamber 21, a positioner 7 and a pneumatic duct system 9 for transmitting pneumatic control signals from the positioner 7 to the actuator 1. A control armature 13 is operated by the actuator 1 via a control drive shaft or rod. The control armature 13 according to FIGS. 1 and 2 is designed as a pivoting armature, the pivoting direction of which is indicated by the arrow 15.

In the example shown in FIG. 1 the actuator 1 has a safety function according to which the control armature 13 is automatically pushed into a predetermined operational situation (emergency position) in which it closes a process duct, not represented, of a technical processing installation, not represented. The automation mechanism of the process of closing the duct is realized by a means for mechanical energy storage that, for example, may be realized as a backwards acting helical spring 17 that, in the example shown, is disposed in the return chamber 21 and presses against a moveable control piston 23 and a rigid inner wall of the return chamber 21.

The control piston 23 is mounted exclusively movable in a translational manner back and forth corresponding to the inside of the actuator housing 3 such that the working chamber 5 is essentially fluid-tight with respect to the return chamber 21 in the area of the sliding surface between the control piston and the inner side of the actuator housing, in order to prevent an exchange of fluid between the working chamber 5 and the return chamber 21 passing between the control piston and the inside of the actuator housing.

The control piston 23, acting as a dividing wall, translationally moves back and forth according to the pressure difference in the chambers 5, 21, which is indicated by the double arrow 25. In case of an overpressure in the working chamber 5, the control piston 23 moves towards the right. In case of a pneumatic overpressure in the return chamber 21 as well as in case of pressure balance, owing to the helical compression spring 17, the control piston moves towards to the left, whereby the control armature is closed.

The positioner 7 is connected to a constant pneumatic pressure source of, for example, 6 bar, indicated by the arrow 27 in FIG. 1. The pneumatic pressure source 27 is connected to the positioner 7 via an input duct 31. The positioner 7 has a microprocessor not shown in detail, capable of computing a setpoint control signal on the basis of an internal control routine according to an actual position signal determined and transmitted by a position sensor, not shown in the Figure. The positioner 7 has a pneumatic control outport 33 connected to the pneumatic working chamber 5 via a pneumatic coupling duct 11 of the duct system 9. Along the coupling duct 11 a branch connection 37 is provided pneumatically connecting a venting sink (atmospheric pressure) indicated by arrow 35 to the coupling duct 11 via a venting duct 41. The branch connection 37 and the branch connection 39 that leads into the return chamber 29, as well as the duct section connecting the two branch connections 37, 39 form a short circuit duct in which a balancing valve in the form of a solenoid valve 43a is disposed being capable of opening and closing the pneumatic short-circuit.

According to the embodiment of FIG. 1, a pair of solenoid valves 43a, 43b is provided that are both, for example via corresponding electric lines 45a, 45b, subjected to control signals from the positioner 7. The solenoid valve 43b, close to the venting sink 35, can be closed in order to prevent a pressure reduction in the return chamber 21 towards the venting sink. In the open state of the solenoid valve 43b the return chamber 21 is always vented and subjected to atmospheric pressure.

The solenoid valve 43a adjacent to the coupling duct 11 serves the purpose of short-circuiting the working chamber and the return chamber 21 via the short-circuit duct structure comprised of a portion of the coupling duct 11 adjacent to the working chamber, a portion of the venting duct 41, and the branch connections 37, 39. This means that in the open state of the solenoid valve 43a a pressure balance is realized between the working chamber 5 and the return chamber 21. If at the same time the second solenoid valve 43b assigned to the venting sink 35 is open, then both pneumatic working chambers are vented so that the helical compression spring 17 can safely move the control armature 13 into the predetermined emergency position.

If the solenoid valve 43a adjacent to the coupling duct is closed, normal operation of the actuator can proceed by building up a specified control pressure p1 in the working chamber. In this case, the solenoid valve 43b facing the venting sink 35 can be opened in order to subject the return chamber 21 to atmospheric pressure (1 bar).

The positioner 7 is connected to a pressure sensor 51 in a signal transmitting manner, wherein the pressure sensor captures the control pressure p1 of the pneumatic working chamber 5.

In case that the control piston 23 does not displace sufficiently upon a first pressure build-up due to the high static friction of the control piston 23 at the inside of the actuator housing 3, but instead only occurs after further pressure increase in the working chamber 5 corresponding to the control process, a sudden displacement of the control piston may occur after the static friction is overcome. For example, upon capturing such a high working pressure p1 followed by a sudden pressure decrease the solenoid valve 43a is opened while the solenoid valve 43b adjacent to the venting sink 35 is closed in order to dampen the too high pressure difference between the working chamber 5 and the return chamber 21. While the solenoid valve 43a adjacent to the coupling duct 11 is open, inversely to the pressure reduction in the working chamber 5, an opposing pressure is building up in the return chamber 21 slowing down the dividing piston 23 and preventing an overshooting of the dividing piston 23. Once the danger of overshooting is avoided, the solenoid valve 43a can be closed again in order to establish the desired specified pressure difference between the working chamber 5 and the return chamber 21.

If an increased static friction occurs during the venting process of the pneumatic actuator 1, wherein the control piston 23 does not move into the desired emergency position under the effect of a spring force, the solenoid valve 43b adjacent to the venting sink can be closed during the venting process in a first time while at the same time the solenoid valve 43a adjacent to the coupling duct 11 is open in order to achieve a pressure balance and thus a decrease of the overpressure p1 in the working chamber 5 and a correspondingly inverse pressure build up in the return chamber, thereby achieving an increased impulse for displacement of the control piston 23 into the emergency position.

The embodiment shown in FIG. 2 relates to the pneumatic double action actuator in which the positioner 7 transmits a control signal to a main working chamber as well as to the return chamber. In particular the pneumatic control signals are inverse to each other. For good readability of the Figure description similar or identical components of the actuator according to FIG. 2 are given reference numerals as in FIG. 1 except that they are raised by 100.

The structure of the duct system 109 is distinguished by the duct system 9 according to FIG. 1 in that a further coupling duct 161 is provided beside the coupling duct 111 providing a direct connection between the positioner 107 and the return chamber 121 of the double action actuator 101. Both coupling ducts 111, 161 are connected via a short-circuit line 153 in which a solenoid valve 143 is disposed that can be controlled via an electric line 145 by the positioner 107.

Therein, it is possible to pressurize the return chamber 121 with a control pressure p2. Depending on how the solenoid valves (not represented) of the positioner 107 are set, the return chamber 121 can be connected with the venting sink 135 and thus can be vented.

In case that the above described stick-slip occurs, the positioner 107 controls the balancing valve 143 such that the short-circuit duct 153 between the coupling ducts 111, 161 is opened so that a direct pneumatic coupling of the working chamber 105 and the return chamber 121 is achieved. In this way the control piston 123 is slowed down and an overshooting of the dividing wall following the appearance of stick-slip is prevented.

In the case that stick-slip occurs during venting of the actuator 103, the solenoid valve 143 can be opened also in this case in order to directly bring about a pressure decrease in the working chamber 105.

Figure 3:
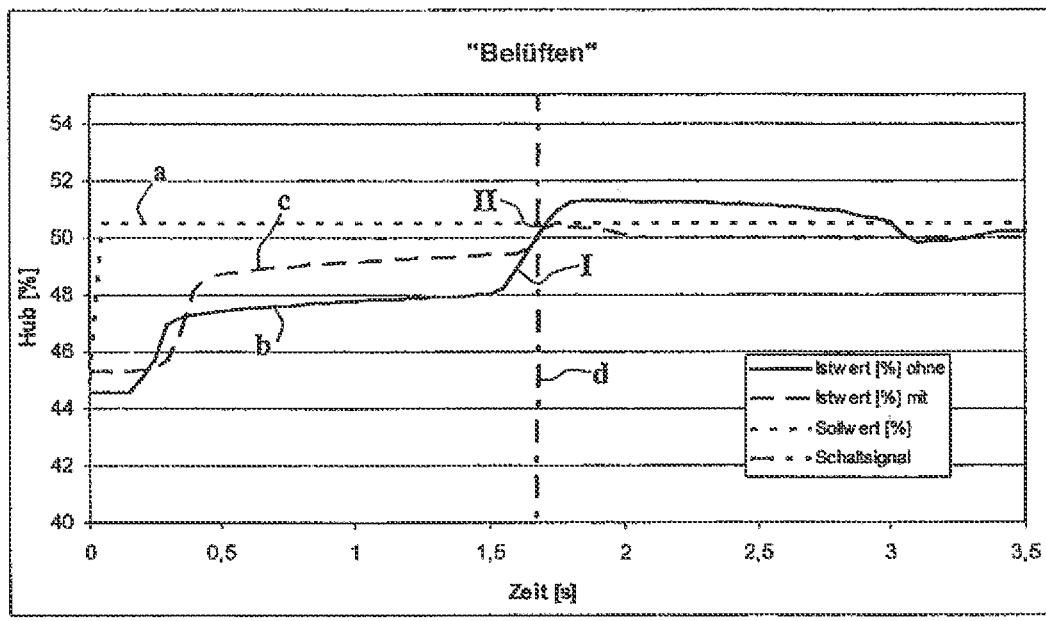
FIG. 3 is a stroke/time diagram in which the path of the stroke of the control armature is presented for a pressurizing process of the pneumatic actuator with and without the pneumatic short circuit according to the preferred embodiment.

The diagram in FIG. 3 shows the course of the control armature during pressurizing the pneumatic actuator fitted with a short=circuit line having a balancing valve (43a, 43b, 143). The dotted line a at 50.5% represents a specified position. At the time point "0 seconds" the stroke position of 50.5% shall be adopted and kept during the total testing time until "3.5 seconds". The solid line b represents the actual position over time without the short-circuit mechanism according to the preferred embodiment of the invention. The dashed line c represents the actual position of an actuator with the short circuit mechanism. The switching time of the balancing valve in the short-circuit duct is represented as dash-dotted vertical line d at 1.6 seconds.

For an optimum experimental arrangement for best comparability of an actuator with a short-circuit mechanism and an actuator without a short-circuit mechanism, the two lines b and c would have to be congruent up to the time of switching of the balancing valve. Since however in practical application identical repeatable positioning processes are barely possible owing to the constantly changing physical conditions, a slight offset is present between the characteristic lines b and c. However, the effect according to the preferred embodiment of the invention is clearly visible from the very similar path of the curves before and the different behavior after the switching time.

From the solid line b of the actuator without a short-circuit mechanism it is evident how the actuator changes its position until the stroke nearly stagnates at 47% over a time period of more than 1 second. Since the specified position has not been adopted yet during this time, the control pressure in the working chamber of the actuator is continuously raised by the positioner. After 1.5 seconds the built up pressure is so high that the mechanical resistance opposing the actuator is suddenly overcome, which is visible from the steep rise I between 1.5 and 2 seconds of the position curve b. Such a path as in curve b is typical for the occurrence of stick-slip as described above for common actuators. Owing to the excess pressure in the working chamber following the surmounting of the resistance, the specified value is by far exceeded (by more than 1%), and an uncontrolled jerk of more than 3% occurs with respect to the stroke. Owing to the inertia of the position control system, it takes over 1 second until the actual position is adopted by means of an elaborate reverse control, and the specified value is only reached after a total control time of 3.5 seconds.

Figure 4:
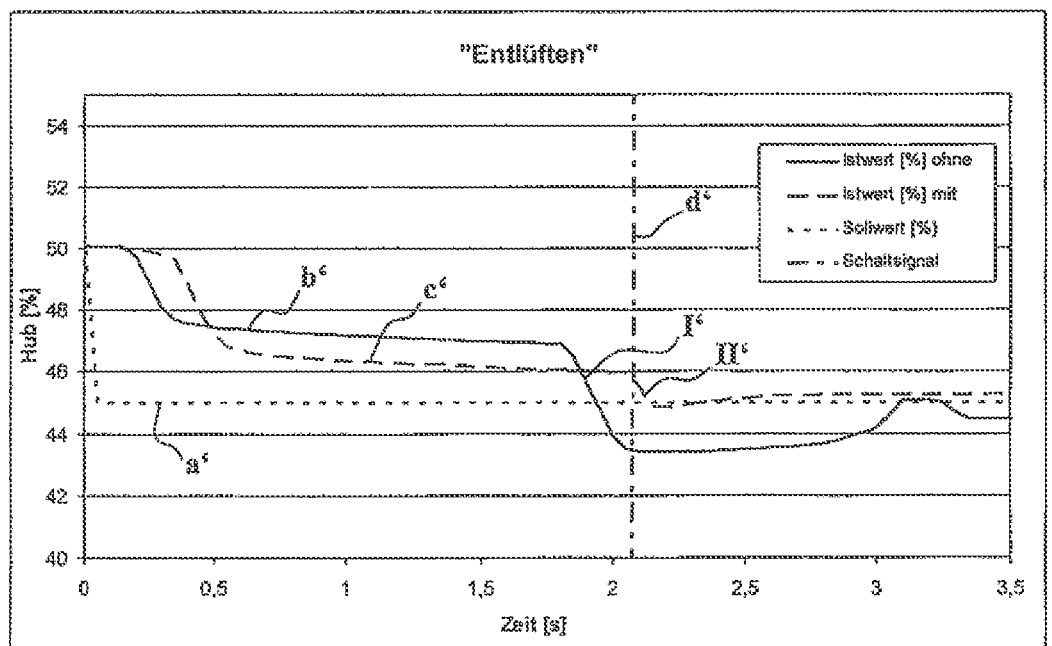
FIG. 4 is a stroke/time diagram showing the path of the stroke of the control armature for a venting process of the pneumatic actuator with and without the pneumatic short circuit according to the preferred embodiment.

In the first 1.5 seconds the dashed position curve c of an actuator having a short-circuit mechanism runs, as explained above, very similar to the position curve of the actuator having no short-circuit mechanism. Once after 1.6 seconds the mechanical resistance is overcome owing to the pressure built up in the working chamber, the control piston moves suddenly to the specified position leading to a drop of the excess pressure built up in the working chamber. The sudden movement of the control piston is sensed by a position sensor and the pressure drop can be sensed by a pressure sensor, and this information is transmitted to the positioner which thereupon short-circuits the main working chamber and the return chamber by means of operating the balancing valve. The pressure reduction in the main working chamber caused by the short-circuit in the moment of the first rapid movement of the control piston, causes the working pressure in the main working chamber to drop and respectively inversely the pressure in the return chamber to rise. Owing to this pressure balance provoked in the chambers the over-accelerated control piston is slowed down so that the value of the actual position reaches the value of the required position without overrunning the latter after a total control time of only two seconds. As evident from comparing the curves b and c in FIG. 3, the jerk due to the stick-slip-effect for a pneumatic actuator with a short-circuit mechanism is significantly lower at only about 1%, and as a consequence no overshooting of the specified value a occurs. The advantage according to the preferred embodiment of the invention of flattening or straightening the stroke over time curve can also be analyzed during venting of the pneumatic actuator in consulting FIG. 4. It is evident that the short-circuiting according to the preferred embodiment of the invention between the working chamber and the return chamber leads to avoid overrunning the specified value, which would occur in the case of a classic, known control valve.

Because of the unchanged stroke position detected by a positioning sensor, the positioner continues to increase the pneumatic control pressure in the return chamber in order to reach the desired set value (a'). The dotted line (a') at 45% represents the set value for the stroke position. The full line b' represents the stroke position over time of an actuator not having a short-circuit mechanism. The dashed line c' represents the stroke position over time of an actuator having a short-circuit mechanism. The dash dotted line d' at 2.1 seconds indicates the time point of switching the balancing valve.

The actual position curve b' of the actuator without a short-circuit mechanism indicates that after initially changing in the direction of the set value the position of the actuator subsequently remains nearly unchanged for a period of over 1 second (from about 0.5 seconds up to 2 seconds) owing to a resistance opposing the movement of the actuator. Once a sufficiently high pressure is achieved in the return chamber for overcoming the resistance, the stroke position of the actuator without a short-circuit mechanism jerkingly changes (at position I') and the specified value is significantly undercut in a first time owing to the excess pressure in the return chamber and only reaches the specified value (a') by means of an elaborate subsequent control in the course of the following 1.5 seconds. As evident from FIG. 4, the control armature undershoots the set position value (a') by about 3%.

In contrast, the dashed line representing the actuator with a short-circuit mechanism shows virtually no undercutting of the set position value and a significantly faster attainment of the position set value after only 2.5 seconds. The amplitude of downward oscillation II' is significantly smaller than the one of the actuator without short-circuit mechanism at I'. The measure according to the preferred embodiment of the invention of providing a pneumatic short circuit for compensating the stick-slip-effect straightens the path of the stroke/time curve, by means of which a faster and more precise control of the position of the control armature. This is attributable to the fact that the positioner detects the pressure drop upon overcoming the resistance opposed to the actuator and accordingly operates the solenoid valve whereby the return chamber and the working chamber are short-circuited whereby a pressure balance is achieved. According to FIGS. 3 and 4, the calming down time of the control system having a short-circuit mechanism is reduced by several times with respect to a system not having a short-circuit mechanism.

In order to capture the occurrence of stick-slip a pressure sensor is provided for the first working chamber as well as for the return chamber.

Following the activation of the pneumatic short circuit of the actuator according to the preferred embodiment of the invention, the following is to be observed. In case that return forces permanently act at the control armature and/or at the positioning wall, for example by means of a return spring, care is to be taken that the pneumatic short-circuit is maintained only for a short time, for example shorter than 1 second, in particular shorter than 0.5 seconds, in particular shorter than 0.1 or 0.2 seconds. After the short term activation of the pneumatic short-circuit, it is to be deactivated again in order to allow the build up of the pressure difference in the working chambers necessary for adopting the set position. Preferably the duration of maintaining the pneumatic short-circuit is to be adjusted such that the pneumatic short-circuit is deactivated in any case before the control armature reaches a static position, i.e. during a dynamic positioning movement.

Upon deactivation of the pneumatic short-circuit for example at less than 1 second, the positioner will output the set pressure signal to the working chamber of the working chambers in order to build up the desired pressure difference for positioning the control armature.

The features disclosed in the Figures and the Claims may be significant for the realization of the invention in its different embodiments individually or in any combination.

Although a preferred exemplary embodiment is shown and described in detail in the drawings and in the preceding specification, it should be viewed as purely exemplary and not as limiting the invention. It is noted that only a preferred exemplary embodiment is shown and described, and all variations and modifications that presently or in the future lie within the protective scope of the invention should be protected.

I claim as my invention:

1. A pneumatic actuator for setting a control armature, comprising:
    a first working chamber and a second working chamber, the first and second working chambers being pneumatically separated from each other by a movable dividing wall to which the control armature is coupled in a force-transmitting manner, said dividing wall in case of a pressure difference between the working chambers being displaced in a first control direction;
    a positioner adapted to output at least one pneumatic control signal to the first working chamber;
    the first and the second working chambers being pneumatically connected to each other via a pneumatic short-circuit duct and with a balancing valve disposed in the short-circuit duct for at least one of closing or opening the short-circuit duct, the balancing valve being drivable by the positioner such that, in case of a certain operating condition detected by said positioner, the balancing valve pneumatically short-circuits the first and the second working chambers for achieving a pressure balance which equalizes pressure between the chambers; and
    said certain operating condition comprises a stick-slip state of the control armature, the positioner being connected to sense a slipping movement of the control armature after a sticking of the control armature, said short-circuiting by the balancing valve occurring when the control armature slips.

2. The pneumatic actuator of claim 1 wherein the control armature comprises a control valve.

3. The pneumatic actuator of claim 1 wherein the second working chamber comprises a return chamber.

4. The pneumatic actuator of claim 1 wherein the positioner is adapted to also output a further pneumatic control signal to the second working chamber.

5. The pneumatic actuator according to claim 1 wherein the balancing valve comprises a 2-port/2-way valve or at least one magnetic valve.

6. The pneumatic actuator according to claim 1 wherein the second working chamber is impinged by a further pneumatic control signal from the positioner, and the balancing valve is disposed to short-circuit two pneumatic coupling ducts from the positioner which pneumatically connect the positioner to the respective first and second chambers for transmission of the respective one and further pneumatic control signals.

7. The pneumatic actuator according claim 1 wherein a pneumatic venting duct is provided from the second working chamber to an atmosphere-side venting sink, a switchable valve being disposed in the venting duct in order to connect the second working chamber to atmospheric pressure in an open state, and the switchable valve is actuated by the positioner in order to close the connection between the second working chamber and atmospheric pressure for pressure balancing.

8. The pneumatic actuator according to claim 1 wherein the positioner outputs the at least one pneumatic control signal to the first working chamber via a coupling duct, the balancing valve comprises a first magnetic valve, a second magnetic valve being provided in a pneumatic venting duct that extends from the short circuit duct to a pneumatic venting sink, and the second magnetic valve being controlled by the positioner to open or close the pneumatic venting duct.

9. The pneumatic actuator according to claim 8 wherein for pressure balancing the first magnetic valve is opened by the positioner and the second magnetic valve is closed by the positioner, or for a normal operation without pressure balancing the first magnetic is closed by the positioner and the second magnetic valve is closed by the positioner.

10. The pneumatic actuator according to claim 1 wherein the first and the second working chambers are delimited by a cylindrical outer housing, the dividing wall comprises a piston movably and fluid-tightly mounted at an inside of the outer housing; and in the return chamber a return spring is disposed for displacing the dividing wall into a return direction opposite to the first control direction.

11. The pneumatic actuator according to claim 1 wherein a pressure sensor is provided in at least one of the first and second working chambers and is connected in a signal transmitting manner to the positioner.

12. The pneumatic actuator according to claim 1 wherein a duration of the pneumatic short-circuiting of the first and the second working chambers is shorter than 1.0 second.

13. A method for operating a pneumatic actuator for actuating a control armature and having a first working chamber and a second working chamber with a moveable dividing wall therebetween and wherein the first and second working chambers are pneumatically impinged, comprising the steps of: pneumatically connecting the first and second working chambers to each other selectively via a balancing valve and, in case of a certain operating condition, short-circuiting the first and the second working chambers, said certain operating condition comprising a stick-slip state of the control armature, a positioner being connected to sense a slipping movement of the control armature after a sticking of the control armature, the balancing valve being drivable by the positioner, and said short-circuiting by the balancing valve occurring when the control armature slips.

14. The method according to claim 13 wherein said control armature comprises a control valve.

15. The method of claim 13 wherein the second working chamber comprises a return chamber.

16. The method of claim 13 including providing the positioner which outputs at least one pneumatic control signal to the first working chamber.

17. The method of claim 13 wherein the positioner outputs a first pneumatic control signal to the first working chamber and a second pneumatic control signal to the second working chamber.

18. A pneumatic actuator for setting a control armature, comprising:
    a first working chamber and a second working chamber, the first and second working chambers being pneumatically separated from each other by a movable dividing wall of a control piston to which the control armature is coupled in a force-transmitting manner, said dividing wall in case of a pressure difference between the working chambers being displaced in a first control direction;

a positioner adapted to sense a movement of the control armature and which is adapted to output at least one pneumatic control signal to the first working chamber; and the first and the second working chambers being pneumatically connected to each other via a pneumatic short-circuit duct and with a balancing valve disposed in the short-circuit duct for closing or opening the short-circuit duct, the balancing valve being drivable by the positioner such that, in case of a stick-slip operating condition comprising a stuck position of the control armature followed by a slipping of the control armature detected by said positioner after static friction is overcome, the balancing valve pneumatically short-circuiting the first and the second working chambers when the control armature slips for achieving a pressure balance which equalizes pressure between the chambers.

* * * * *